United States Patent
Kuramitsu et al.

(10) Patent No.: US 10,538,265 B2
(45) Date of Patent: Jan. 21, 2020

(54) ROTARY ELECTRIC DEVICE CONTROL DEVICE, AND ELECTRIC POWER STEERING DEVICE USING THE SAME

(71) Applicant: DENSO CORPORATION, Kariya, Aichi-pref. (JP)

(72) Inventors: Shuji Kuramitsu, Kariya (JP); Koichi Nakamura, Kariya (JP); Atsuko Oka, Kariya (JP); Masaya Taki, Kariya (JP); Hideki Kabune, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/405,129

(22) Filed: May 7, 2019

(65) Prior Publication Data
US 2019/0256130 A1 Aug. 22, 2019

Related U.S. Application Data

(63) Continuation of application No. PCT/JP2017/040405, filed on Nov. 9, 2017.

(30) Foreign Application Priority Data

Nov. 11, 2016 (JP) ................. 2016-220475

(51) Int. Cl.
*B62D 5/04* (2006.01)
*B62D 6/00* (2006.01)
(Continued)

(52) U.S. Cl.
CPC .......... *B62D 5/0463* (2013.01); *B62D 5/003* (2013.01); *B62D 6/00* (2013.01); *H02P 25/22* (2013.01); *H02P 27/06* (2013.01)

(58) Field of Classification Search
CPC ....... B62D 5/003; B62D 5/0463; H02P 27/06; H02P 25/22
See application file for complete search history.

(56) References Cited

U.S. PATENT DOCUMENTS 10,266,198 B2 * 4/2019 Fujita .................. B62D 5/0463
2005/0159866 A1 7/2005 Takeuchi et al.
(Continued)

FOREIGN PATENT DOCUMENTS

JP 3839358 B2 8/2006
JP 2011-195089 A 10/2011
(Continued)

*Primary Examiner* — Kevin Hurley
(74) *Attorney, Agent, or Firm* — Knobbe, Martens, Olson & Bear, LLP (57) ABSTRACT

A rotary electric device control device for controlling driving of a rotary electric device including a plurality of winding sets, includes: a plurality of drive circuits; and a plurality of control units that include signal output units for outputting control signals to the drive circuits corresponding to the control units, respectively. The one of the control units generates a control signal according to a command value calculated by each system, a host system detection value relating to a detection value of a host system, and another system detection value relating to another detection value of another system. An electric power steering device includes: the rotary electric device control device; the rotary electric device that outputs an assist torque for assisting a steering operation of a steering wheel by a driver; and a power transmission unit that transmits a driving force of the rotary electric device to a drive target.

6 Claims, 6 Drawing Sheets

(51) Int. Cl.
*B62D 5/00* (2006.01)
*H02P 27/06* (2006.01)
*H02P 25/22* (2006.01)

(56) References Cited

U.S. PATENT DOCUMENTS

| | | | |
|---|---|---|---|
| 2017/0315514 A1* | 11/2017 | Kitamoto | B62D 5/046 |
| 2018/0354549 A1* | 12/2018 | Tsubaki | B62D 5/0487 |
| 2019/0144030 A1* | 5/2019 | Sakai | B62D 5/0463 |
| | | | 318/3 |
| 2019/0267925 A1* | 8/2019 | Furukawa | H02P 25/22 |

FOREIGN PATENT DOCUMENTS

| | | | | | |
|---|---|---|---|---|---|
| JP | 2016-149904 A | | 8/2016 | | |
| JP | 2016-174510 A | | 9/2016 | | |
| JP | 2017169384 A | * | 9/2017 | | B62D 5/04 |
| WO | WO-2018088463 A1 | * | 5/2018 | | |
| WO | WO-2018088465 A1 | * | 5/2018 | | |

* cited by examiner

ROTARY ELECTRIC DEVICE CONTROL DEVICE, AND ELECTRIC POWER STEERING DEVICE USING THE SAME

CROSS REFERENCE TO RELATED APPLICATION

The present application is a continuation application of International Patent Application No. PCT/JP2017/040405 filed on Nov. 9, 2017, which designated the U.S. and claims the benefit of priority from Japanese Patent Application No. 2016-220475 filed on Nov. 11, 2016. The entire disclosures of all of the above applications are incorporated herein by reference.

TECHNICAL FIELD

The present disclosure relates to a rotary electric device control device and an electric power steering device using the same.

BACKGROUND

Conventionally, an electric power steering device for assisting steering by a driving force of a motor has been known. For example, two microcomputers independently calculate a basic assist control amount.

SUMMARY

According to an aspect of the present disclosure, a rotary electric device control device for controlling driving of a rotary electric device including a plurality of winding sets, includes: a plurality of drive circuits; and a plurality of control units that include signal output units for outputting control signals to the drive circuits corresponding to the control units, respectively. The one of the control units generates a control signal according to a command value calculated by each system, a host system detection value relating to a detection value of a host system, and another system detection value relating to another detection value of another system.

According to another aspect of the present disclosure, an electric power steering device includes: the rotary electric device control device; the rotary electric device that outputs an assist torque for assisting a steering operation of a steering wheel by a driver; and a power transmission unit that transmits a driving force of the rotary electric device to a drive target.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

An electric power steering device assists steering by a driving force of a motor. For example, two microcomputers independently calculate a basic assist control amount.

When an assist control amount is calculated independently in each system and current control is performed independently, inconsistencies may occur between the systems. Thus, a rotary electric device control device that controls driving of a rotary electric device while coordinating multiple systems with each other, and an electric power steering device using the control device are provided.

In the above features, the control signal is generated with the use of the host system detection value and the other system detection value, which are, for example, current detection values, in common in the respective control units. As a result, a plurality of systems can be appropriately cooperatively operated, and inconsistencies between the systems and complexity of arbitration can be reduced.

Hereinafter, a rotary electric device control device and an electric power steering device according to the present disclosure will be described with reference to the drawings. Hereinafter, in a plurality of embodiments, substantially the same configurations are denoted by identical symbols, and a repetitive description will be omitted.

First Embodiment

Figure 1:
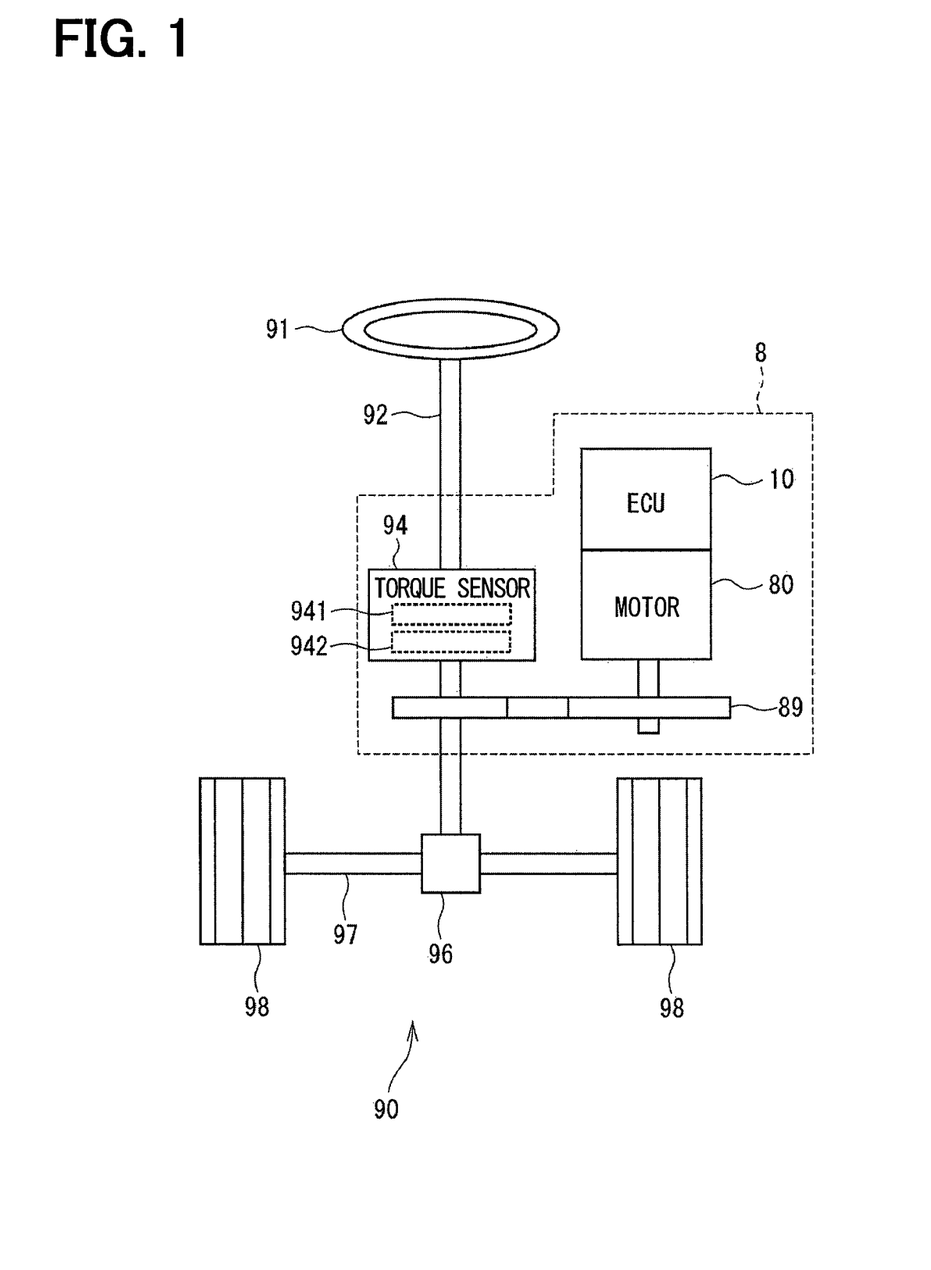
FIG. 1 is a schematic configuration diagram of a steering system according to a first embodiment.
Figure 2:
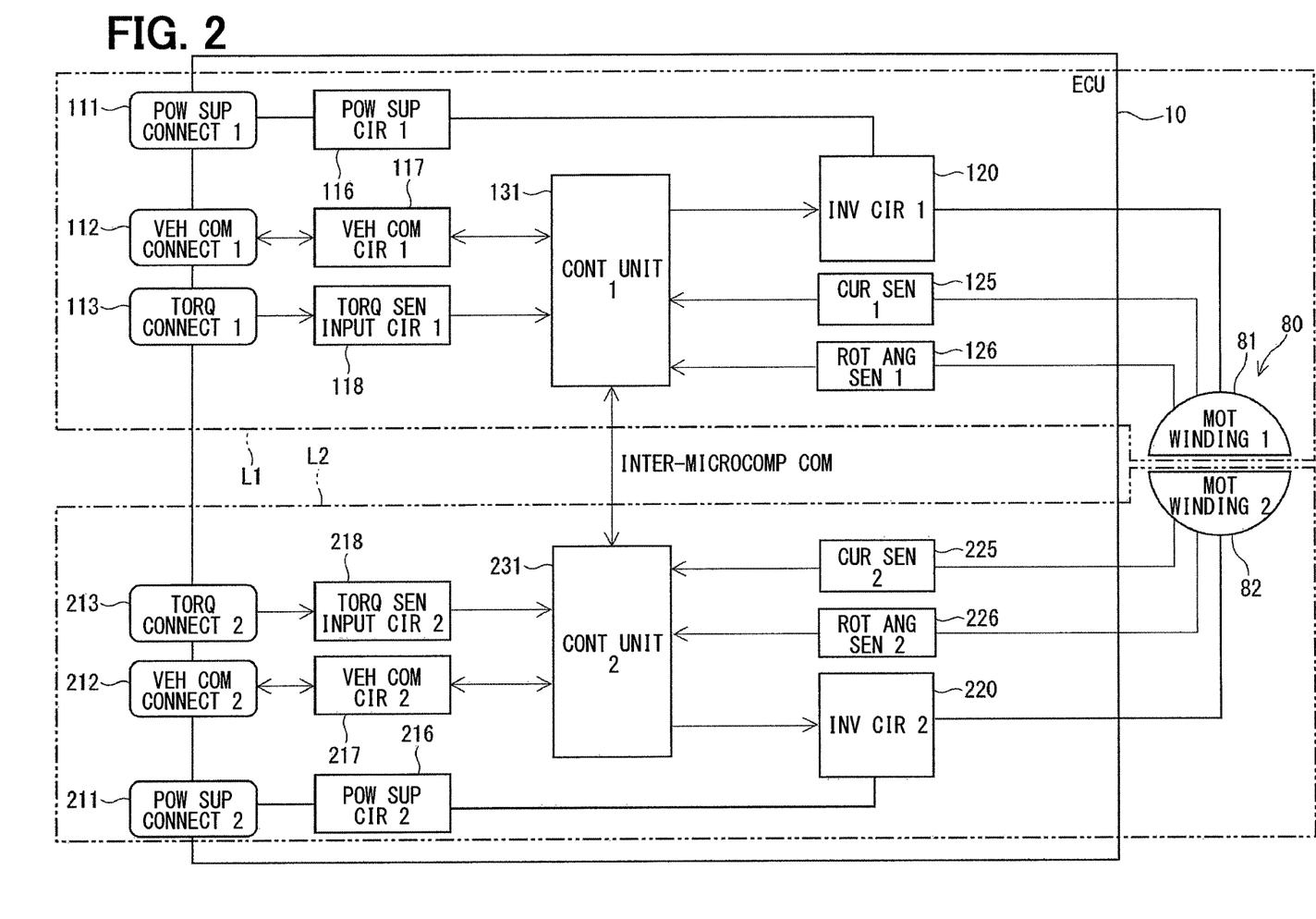
FIG. 2 is a block diagram showing a motor control device according to the first embodiment.

A first embodiment of the present disclosure is shown in FIGS. 1 to 5. As shown in FIGS. 1 and 2, a motor control device 10 as a rotary electric device control device according to the present embodiment is applied to, for example, an electric power steering device 8 for assisting a steering operation of a vehicle together with a motor 80 as a rotary electric device. In the drawing, the motor control device 10 is referred to as an "ECU". FIG. 1 shows an overall configuration of a steering system 90 including the electric power steering device 8.

FIG. 1 shows a configuration of a steering system 90 including the electric power steering device 8. The steering system 90 includes a steering wheel 91 as a steering member, a steering shaft 92, a pinion gear 96, a rack shaft 97, wheels 98, an electric power steering device 8, and the like. The steering wheel 91 is connected to a steering shaft 92. The steering shaft 92 is provided with a torque sensor 94 for detecting a steering torque Ts. A pinion gear 96 is provided at a tip of the steering shaft 92. The pinion gear 96 meshes with the rack shaft 97. A pair of wheels 98 is connected to both ends of the rack shaft 97 through tie rods or the like.

When the driver rotates the steering wheel 91, the steering shaft 92 connected to the steering wheel 91 rotates. A rotational movement of the steering shaft 92 is converted into a linear movement of the rack shaft 97 by the pinion gear 96. The pair of wheels 98 are steered to an angle corresponding to the displacement amount of the rack shaft 97.

The electric power steering device 8 includes a motor 80, a reduction gear 89 serving as a power transmission portion for reducing the rotation of the motor 80 and transmitting the reduced rotation to the steering shaft 92, a motor control device 10, and the like. In other words, the electric power steering device 8 according to the present embodiment is a so-called "column assist type", but may be a so-called "rack assist type" which transmits the rotation of the motor 80 to the rack shaft 97. In the present embodiment, the steering shaft 92 corresponds to a "driven target".

The motor 80 outputs an assisting torque for assisting the driver to steer the steering wheel 91, and is driven by an electric power supplied from a battery (not shown) as a power supply, and rotates the reduction gear 89 in forward and reverse directions. The motor 80 is a three-phase brushless motor, and includes a rotor and a stator, both of which are not shown. As shown in FIG. 2, the motor 80 has a first motor winding 81 and a second motor winding 82 as a winding set. In the figure, the first motor winding 81 is referred to as "motor winding 1" and the second motor winding 82 is referred to as "motor winding 2". In other configurations to be described later, a "first" is described as a subscript "1" and a "second" is described as a subscript "2" as appropriate in the drawings.

Hereinafter, a combination of a first inverter circuit 120, a first control unit 131, and so on involved in the drive control of the first motor winding 81 is referred to as a first system L1 and a combination of a second inverter circuit 220, a second control unit 231, and so on involved in the drive control of the second motor winding 82 is referred to as a second system L2. In the present embodiment, the inverter circuits 120 and 220 correspond to "drive circuits". Hereinafter, the configuration involved in the first system L1 is numbered in the 100-th order, and the configuration involved in the second system L2 is numbered in the 200-th order. In the first system L1 and the second system L2, the same components are numbered so that the last two digits are the same.

The motor control device 10 includes inverter circuits 120 and 220, control units 131 and 231, and so on. The motor control device 10 is provided with a first power supply connector 111, a first vehicle communication connector 112, a first torque connector 113, a second power supply connector 211, a second vehicle communication connector 212, and a second torque connector 213.

The first power supply connector 111 is connected to a first battery (not shown), and the second power supply connector 211 is connected to a second battery (not shown). The connectors 111 and 211 may be connected to the same battery. The first power supply connector 111 is connected to the first inverter circuit 120 through the first power supply circuit 116. The second power supply connector 211 is connected to the second inverter circuit 220 through the second power supply circuit 216. The power supply circuits 116 and 216 are, for example, power supply relays.

The vehicle communication connectors 112, 212 are connected to a vehicle communication network, such as a CAN (Controller Area Network). The first vehicle communication connector 112 is connected to the first control unit 131 through a first vehicle communication circuit 117. The first control unit 131 can exchange information with the vehicle communication network through the connector 112 and the vehicle communication circuit 117. The second vehicle communication connector 212 is connected to the second control unit 231 through a second vehicle communication circuit 217. The second control unit 231 can exchange the information with the vehicle communication network through the connector 212 and the vehicle communication circuit 217.

The torque connectors 113 and 213 are connected to the torque sensor 94. Specifically, the first torque connector 113 is connected to the first sensor unit 941 (refer to FIG. 1) of the torque sensor 94. The second torque connector 213 is connected to the torque sensor 94 and the second sensor unit 942 (refer to FIG. 1). The first control unit 131 can acquire a torque signal involved in the steering torque from the first sensor unit 941 of the torque sensor 94 through the torque connector 113 and a torque sensor input circuit 118. The second control unit 231 can acquire a torque signal involved in the steering torque from the second sensor unit 942 of the torque sensor 94 through the torque connector 213 and the torque sensor input circuit 218. With the above configuration, the control units 131 and 231 can calculate the steering torque Ts based on the torque signal.

The first inverter circuit 120 is, for example, a three-phase inverter having a switching element (not shown), and converts an electric power to be supplied to the first motor winding 81. The ON/OFF operation of the switching element of the first inverter circuit 120 is controlled based on a control signal output from the first control unit 131.

The second inverter circuit 220 is, for example, a three-phase inverter having a switching element (not shown), and converts an electric power to be supplied to the second motor winding 82. The ON/OFF operation of the switching element of the second inverter circuit 220 is controlled based on a control signal output from the second control unit 231.

The first current sensor 125 detects a first U-phase current Iu1, a first V-phase current Iv1, and a first W-phase current Iw1 that are supplied to the respective phases of the first motor winding 81, and outputs the detection values to the first control unit 131. The second current sensor 225 detects a second U-phase current Iu2, a second V-phase current Iv2, and a second W-phase current Iw2 that are supplied to the respective phases of the second motor winding 82, and outputs a detection value to the second control unit 231. Hereinafter, the U-phase current, the V-phase current, and the W-phase current are collectively referred to as "phase current" or "three-phase current" as appropriate. The d-axis current and the q-axis current are collectively referred to as "dq-axis current" as appropriate. The same applies to the voltage.

The first rotation angle sensor 126 detects the rotation angle of the motor 80 and outputs the detected rotation angle to the first control unit 131. The second rotation angle sensor 226 detects the rotation angle of the motor 80 and outputs the detected rotation angle to the second control unit 231. In the present embodiment, an electric angle based on the detection value of the first rotation angle sensor 126 is defined as a first electric angle EleAng1, and an electric angle based on the detection value of the second rotation angle sensor 226 is defined as a second electric angle EleAng2.

The first control unit 131 is supplied with a power through the first power supply connector 111, a regulator (not shown), and the like. The second control unit 231 is supplied with a power through the second power supply connector 211, a regulator (not shown), and the like. The first control unit 131 and the second control unit 231 are provided so as to be able to communicate with each other between the control units. Hereinafter, the communication between the control units 131 and 231 is referred to as "inter-microcomputer communication" as appropriate. As a communication method between the control units 131 and 231, any method such as serial communication such as SPI or SENT, a CAN communication, or the like may be used.

Figure 3:
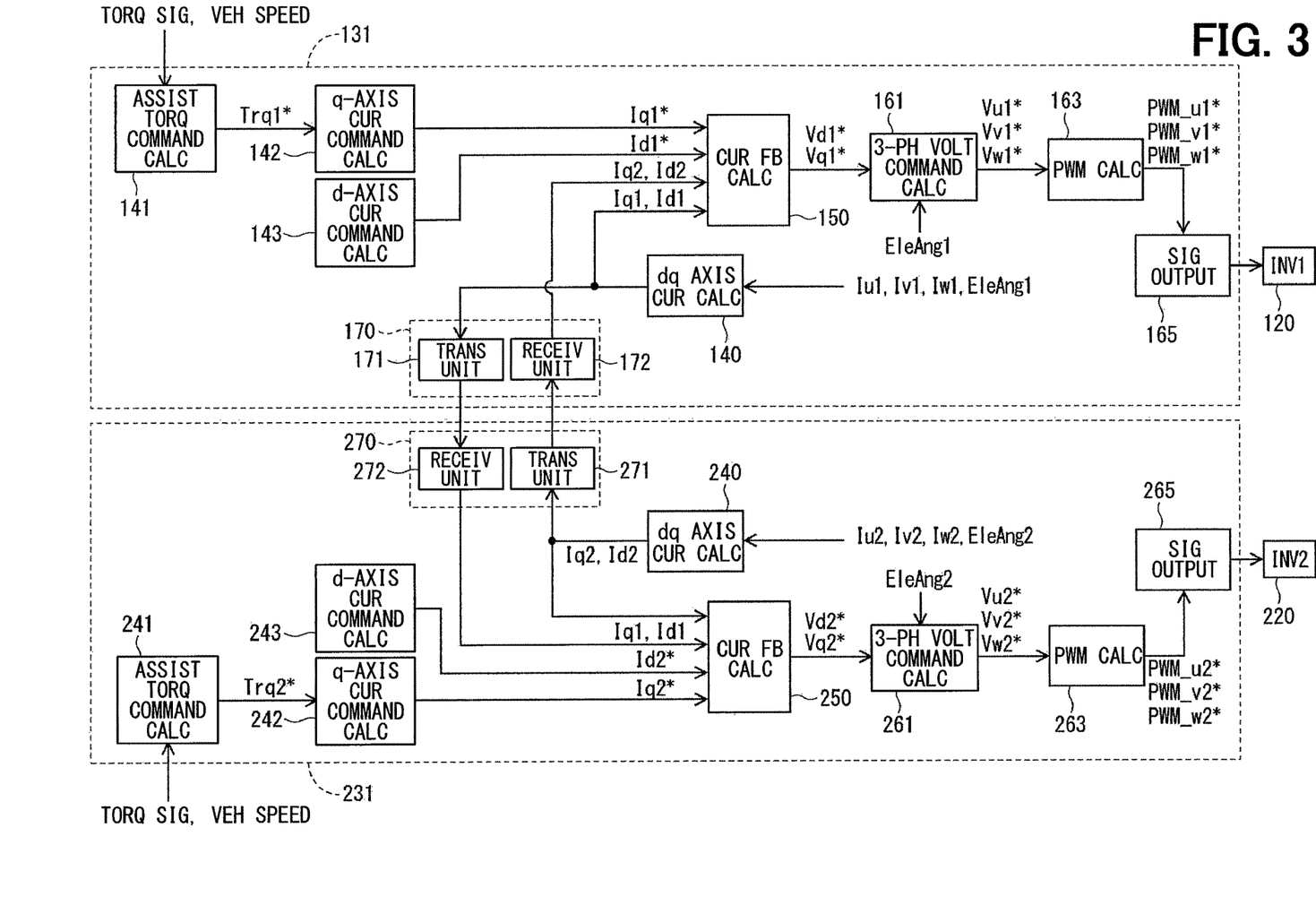
FIG. 3 is a block diagram showing a first control unit and a second control unit according to the first embodiment.

Details of the control units 131 and 231 are shown in FIG. 3. The control units 131 and 231 are mainly configured by a microcomputer or the like. Each processing in the control units 131 and 231 may be software processing by executing a program stored in advance in a tangible memory device such as a ROM by a CPU, or may be hardware processing by a dedicated electronic circuit.

The first control unit 131 includes a first dq-axis current calculation unit 140, a first assist torque command calculation unit 141, a first q-axis current command calculation unit 142, a first d-axis current command calculation unit 143, a first current feedback calculation unit 150, a first three-phase voltage command calculation unit 161, a first PWM calculation unit 163, a first signal output unit 165, and a first communication unit 170. Hereinafter, the feedback is referred to as "FB" as appropriate.

The first dq-axis current calculation unit 140 converts first phase currents Iu1, Iv1, and Iw1 acquired from the first current sensor 125 into a dq-axis with the use of a first electric angle EleAng1, and calculates a first d-axis current detection value Id1 and a first q-axis current detection value Iq1.

The first assist torque command calculation unit 141 calculates a first assist torque command value Trq1* based on the torque signal acquired from the torque sensor 94 through the torque sensor input circuit 118, the vehicle speed acquired from the vehicle communication network through the vehicle communication circuit 117, and the like. The first assist torque command value Trq1* is output to the first q-axis current command calculation unit 142. The first q-axis current command calculation unit 142 calculates a first q-axis current command value Iq1* based on the first assist torque command value Trq1*. The first d-axis current command calculation unit 143 calculates a first d-axis current command value Id1*.

The first current feedback calculation unit 150 performs a current feedback calculation based on first dq-axis current command values Id1*, Iq1*, and dq-axis current detection values Id1, Iq1, Id2, and Iq2, and calculates a first d-axis voltage command value Vd1* and a first q-axis voltage command value Vq1*. The details of the current feedback calculation will be described later.

The first three-phase voltage command calculation unit 161 performs inverse dq transformation on the first dq-axis voltage command values Vd1* and Vq1* with the use of the first electric angle EleAng1 to calculate a first U-phase voltage command value Vu1*, a first V-phase voltage command value Vv1*, and a first W-phase voltage command value Vw1*. The first PWM calculation unit 163 calculates first PWM signals PWM_u1*, PWM_v1*, and PWM_w1* based on the three-phase voltage command values Vu1*, Vv1*, and Vw1*. The first signal output unit 165 outputs the first PWM signals PWM_u1*, PWM_v1*, and PWM_w1* to the first inverter circuit 120.

The first communication unit 170 includes a first transmission unit 171 and a first receiving unit 172, and performs a communication with the second communication unit 270. The first transmission unit 171 transmits a value calculated by the first control unit 131 to the second control unit 231. In the present embodiment, the first transmission unit 171 transmits the first d-axis current detection value Id1 and the first q-axis current detection value Iq1 to the second control unit 231. The first receiving unit 172 receives the value transmitted from the second control unit 231. In the present embodiment, the first receiving unit 172 receives the second d-axis current detection value Id2 and the second q-axis current detection value Iq2. The current command value and the current detection value transmitted and received between the control units 131 and 231 may be a three-phase value instead of the value of the dq-axis, but the amount of data can be reduced by transmitting and receiving the value of the dq axis. Further, transmission and reception of the d-axis current detection values Id1 and Id2 may not be performed.

The second control unit 231 includes a second dq-axis current calculation unit 240, a second assist torque command calculation unit 241, a second q-axis current command calculation unit 242, a second d-axis current command calculation unit 243, a second current feedback calculation unit 250, a second three-phase voltage command value calculation unit 261, a second PWM calculation unit 263, a second signal output unit 265, and a second communication unit 270.

The second dq-axis current calculation unit 240 converts the second phase currents Iu2, Iv2, and Iw2 acquired from the second current sensor 225 into a dq-axis with the use of the second electric angle EleAng2, and calculates a second d-axis current detection value Id2 and a second q-axis current detection value Iq2.

The second assist torque command calculation unit 241 calculates a second assist torque command value Trq2* based on the torque signal acquired from the torque sensor 94 through the torque sensor input circuit 218, the vehicle speed acquired from the vehicle communication network through the vehicle communication circuit 217, and the like. The second assist torque command value Trq2* is output to the second q-axis current command calculation unit 242. The second q-axis current command calculation unit 242 calculates a second q-axis current command value Iq2* based on the second assist torque command value Trq2*. The d-axis current command calculation unit 243 calculates a d-axis current command value Id*.

The assist torque command values Trq1* and Trq2* have the same values unless there are detection errors or the like detected by the sensor units 941 and 942. If the assist torque command values Trq1* and Trq2* are the same, the q-axis current command values Iq1* and Iq2* are also the same values. In the present embodiment, the q-axis current command values Iq1* and Iq2* are set as the q-axis current values of a total of the two systems required for outputting a desired assist torque. The q-axis current command values Iq1* and Iq2* are current sum command values and are obtained by multiplying the assist torque command values Trq1* and Trq2* by motor torque constants. In addition to the q-axis current command values Iq1* and Iq2*, the d-axis current command values Id1* and Id2* correspond to a "current sum command value".

The second current feedback calculation unit 250 performs a current feedback calculation based on the second dq-axis current command values Id2*, Iq2*, and the dq-axis current detection values Id1, Iq1, Id2, and Iq2, and calculates a second d-axis voltage command value Vd2* and a second q-axis voltage command value Vq2*.

The second three-phase voltage command calculation unit 261 performs inverse dq transformation on the second dq-axis voltage command values Vd2* and Vq2* with the use of the second electric angle EleAng2 to calculate a second U-phase voltage command value Vu2*, a second V-phase voltage command value Vv2*, and a second W-phase voltage command value Vw2*. The second PWM calculation unit 263 calculates second PWM signals PWM_u*, PWM_v2*, and PWM_w2* based on the three-phase voltage command values Vu2*, Vv2*, and Vw2*. The second signal output unit 265 outputs the second PWM signals PWM_u2*, PWM_v2*, and PWM_w2* to the second inverter circuit 220.

The second communication unit 270 includes a second transmission unit 271 and a second receiving unit 272. The second transmission unit 271 transmits a value calculated by the second control unit 231 to the first control unit 131. In the present embodiment, the second transmission unit 271 transmits the second d-axis current detection value Id2 and the second q-axis current detection value Iq2. The second receiving unit 272 receives the value transmitted from the first control unit 131. In the present embodiment, the second receiving unit 272 receives the first d-axis current detection value Id1 and the first q-axis current detection value Iq1.

Figure 4:
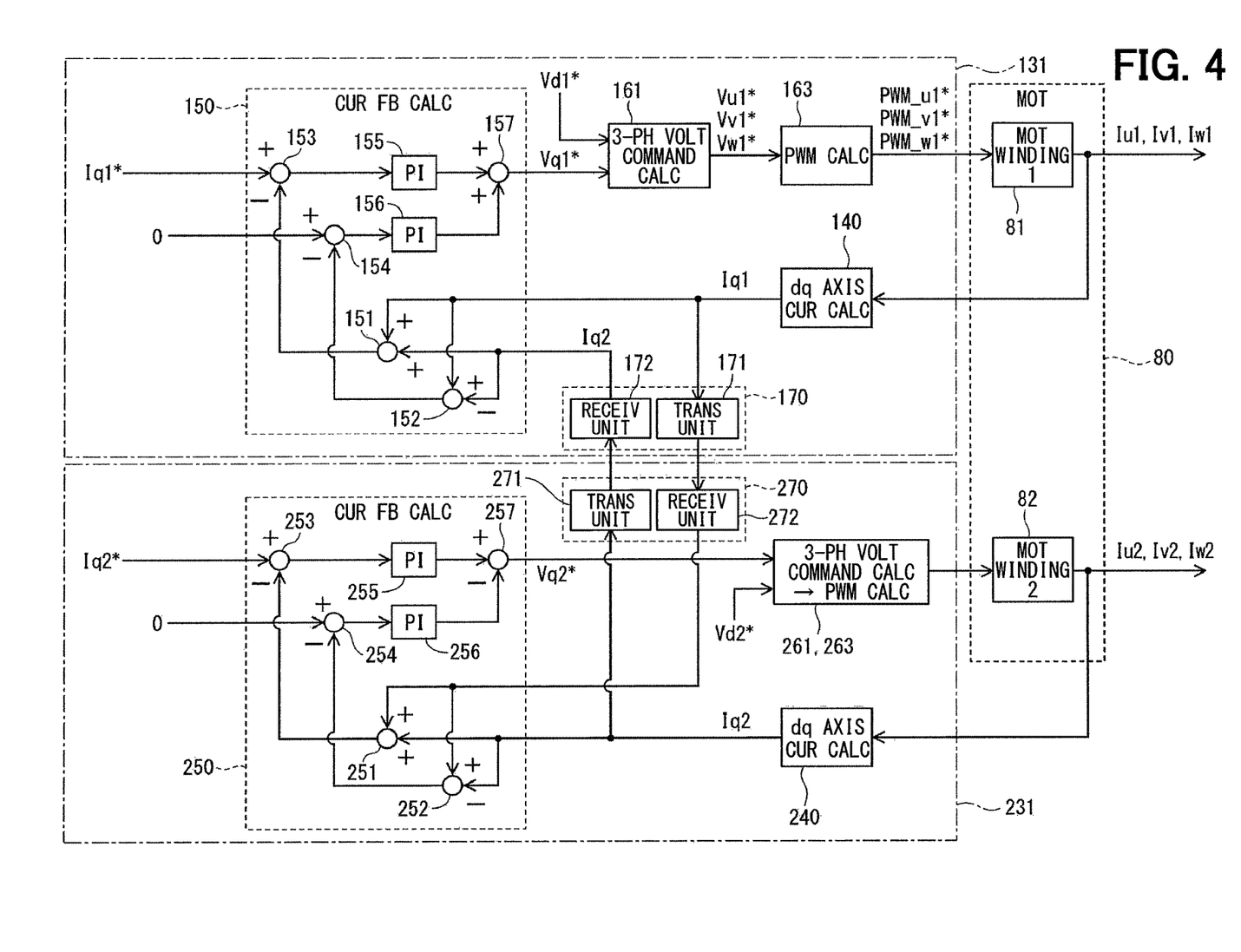
FIG. 4 is a block diagram illustrating a current feedback control according to the first embodiment.

Details of the current feedback calculation units 150 and 250 will be described with reference to FIG. 4. The second three-phase voltage command calculation unit 261 and the second PWM calculation unit 263 are collectively described in one block, and the signal output units 165 and 265, the inverter circuits 120 and 220, and the like are omitted. In FIG. 4, the current feedback calculation involved in the q-axis will be mainly described. The current feedback calculation for the d-axis is the same as that for the q-axis, and therefore a description of that calculation will be omitted.

The first current feedback calculation unit 150 includes an adder 151, subtracters 152 to 154, controllers 155 and 156, and an adder 157. The adder 151 adds the first q-axis current detection value Iq1 and the second q-axis current detection value Iq2 to calculate a first q-axis current sum Iq_a1. The subtractor 152 subtracts the second q-axis current detection value Iq2 from the first q-axis current detection value Iq1 and calculates a first q-axis current difference Iq_d1.

The subtractor 153 subtracts the first q-axis current sum Iq_a1 from the first q-axis current command value Iq1*, and calculates a first current sum deviation $\Delta$Iq_a1. The subtractor 154 subtracts the first q-axis current difference Iq_d1 from the current difference command value to calculate a first current difference deviation $\Delta$Iq_d1. In the present embodiment, the current difference command value is set to 0, and the control is performed so as to eliminate a current difference between the systems. The current difference command value may be set to a value other than 0, and control may be performed so that a desired current difference occurs between the systems. The same applies to the current difference command value input to the subtractor 254.

The controller 155 calculates a basic q-axis voltage command value Vq_b1* by, for example, PI calculation or the like so that the current sum deviation $\Delta$Iq_a1 becomes 0. The controller 156 calculates a q-axis voltage difference command value Vq_d1* by, for example, PI calculation or the like so that the current difference deviation $\Delta$Iq_d1 becomes 0. The adder 157 adds the basic q-axis voltage command value Vq_b1* and the q-axis voltage difference command value Vqq_d1* to calculate a first q-axis voltage command value Vq1*.

The second current feedback calculation unit 250 includes an adder 251, subtracters 252 to 254, controllers 255 and 256, and a subtractor 257. The adder 251 adds the first q-axis current detection value Iq1 and the second q-axis current detection value Iq2 to calculate a q-axis current sum Iq_a2. The subtractor 252 subtracts the second q-axis current detection value Iq2 from the first q-axis current detection value Iq1 and calculates a q-axis current difference Iq_d2. In the present embodiment, since the adders 151 and 251 use the same value, the q-axis current sums Iq_a1 and Iq_a2 have the same value. When values of a different control cycle are used as in the second embodiment, which will be described later, the q-axis current sums Iq_a1 and Iq_a2 have different values. The same applies to the q-axis current differences Iq_d1 and Iq_d2.

The subtractor 253 subtracts the second q-axis current sum Iq_a2 from the second q-axis current command value Iq2*, and calculates a second current sum deviation $\Delta$Iq_a2. The subtractor 254 subtracts the second q-axis current difference Iq_d1 from the current difference command value to calculate a second current difference deviation $\Delta$Iq_d2.

The controller 255 calculates a basic q-axis voltage command value Vq_b2* by, for example, PI calculation or the like so that the current sum deviation $\Delta$Iq_a2 becomes 0. The controller 256 calculates a q-axis voltage difference command value Vq_d2* by, for example, PT calculation or the like so that the current difference deviation $\Delta$Iq_d2 becomes 0. The subtractor 257 subtracts the q-axis voltage difference command value Vq_d2* from the basic q-axis voltage command value Vq_a2* and calculates a second q-axis voltage command value Vq2*.

Figure 5:
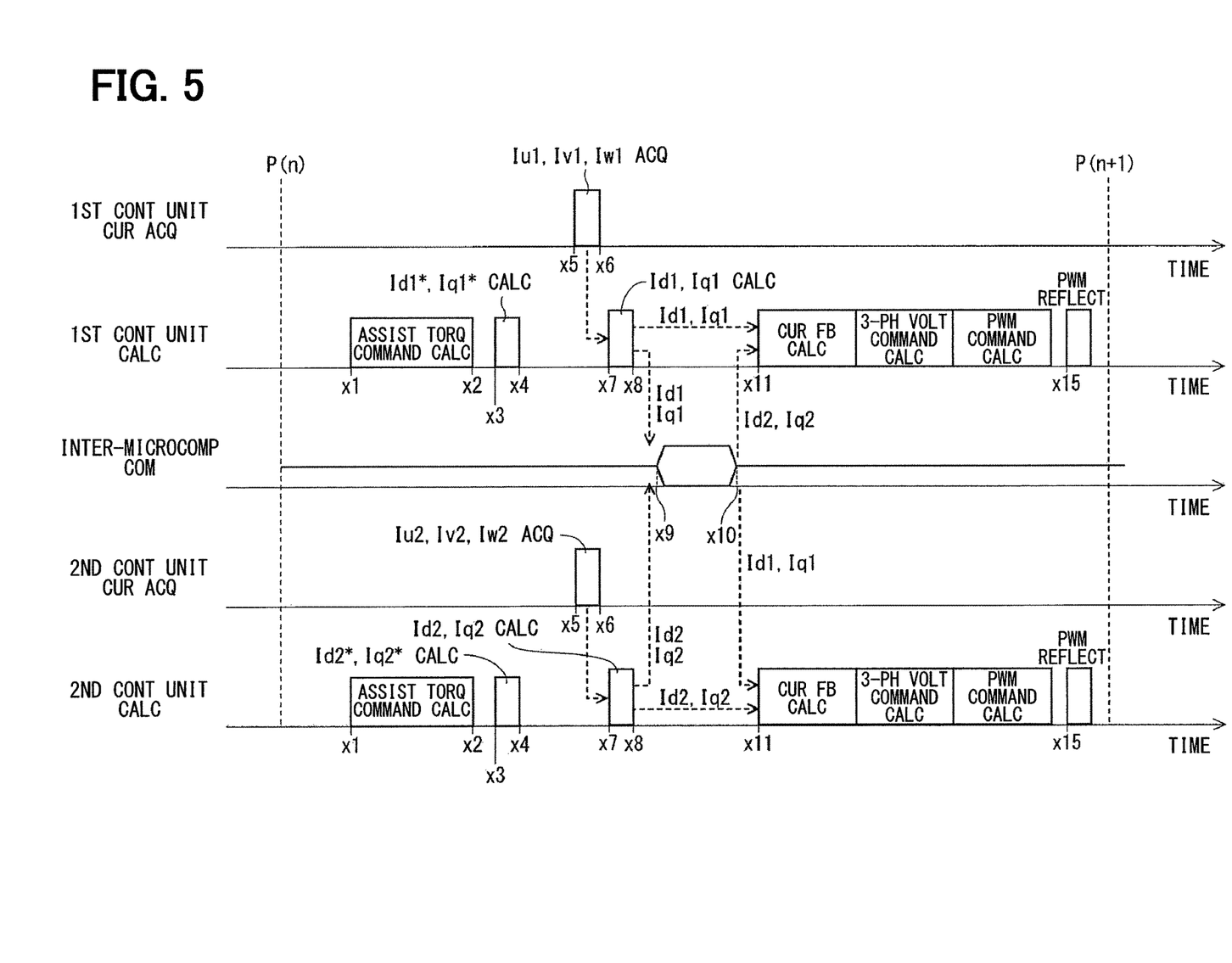
FIG. 5 is a time chart illustrating calculation processing according to the first embodiment.

The calculation processing of the present embodiment will be described with reference to a time chart of FIG. 5. FIG. 5 shows the current acquisition timing of the first control unit 131, the calculation processing in the first control unit 131, the inter-microcomputer communication, the current acquisition timing of the second control unit 231, and the arithmetic processing in the second control unit 231 from the top, with the common time axis as the horizontal axis. In FIG. 5, the current control cycle is denoted as P (n), and the start timing is denoted as "P (n)". The next control cycle is set as P (n+1). The same applies to FIG. 6.

As shown in FIG. 5, the control units 131 and 231 calculate the assist torque command values Trq1* and Trq2* at a time x1 to a time x2, and calculate current command values Id1*, Iq1*, Id2*, and Iq2* subsequently at a time x3 to a time x4. The first control unit 131 acquires the phase currents Iu1, Iv1, and Iw1 from the current sensor 125 at a time x5 to a time x6, and calculates dq-axis current detection values Id1 and Iq1 at a time x7 to a time x8. Similarly, the second control unit 231 acquires the phase currents Iu2, Iv2, and Iw2 from the current sensor 135 at the time x5 to the time x6, and calculates dq-axis current detection values Id2 and Iq2 at the time x7 to the time x8. Although FIG. 5 shows that the command calculation in the control units 131 and 231 and the calculation of the current detection value are performed at the same time, a deviation within a range which is in time for the time x9 at which an inter-microcomputer communication starts is allowed. In addition, in processing after the inter-microcomputer communication, a deviation to the extent that the processing falls within the control cycle is also allowed. The same applies to the embodiments described later.

At the time x9 to a time x10, the inter-microcomputer communication is performed between the control units 131 and 231, and the dq-axis current detection values Id1, Iq1, Id2, and Iq2 are mutually transmitted and received between the controls units 131 and 231. Then, each of the control units 131 and 231 performs the current FB calculation, the three-phase voltage command calculation, and the PWM command calculation from a time x11 after the end of the inter-microcomputer communication, and outputs and reflects the PWM signal to each of the inverter circuits 120 and 220 at a time x15 after the PWM command calculation. In the present embodiment, the inter-microcomputer communication is performed before a start of the current FB control, and information necessary for the current FB calculation is exchanged between the microcomputers. As a result, the control units 131 and 231 can perform the current feedback calculation with the use of the same value.

In the present embodiment, since the assist torque command values Trq1* and Trq2* are calculated in each system and used for generation of the PWM signals, for example, when an abnormality occurs in one system, switching to a single-system driving is relatively easy. In the present embodiment, the dq-axis current detection values Id1, Iq1, Id2, and Iq2 are mutually transmitted and received in the inter-microcomputer communication, and are used for the current FB calculation in the respective control units 131 and 231. In this example, the operation of the motor 80 by controlling the energization of the respective systems with the use of the detection values of the respective systems in common is referred to as "coordinative operation". In particular, in the present embodiment, since the current difference between the systems is controlled to be 0, the heat generation in each system can be equalized. In addition, it is possible to reduce the complexity of control in the case where limiting processing such as current limitation is performed at the time of voltage fluctuation or heat generation, or in the case of backup control in which abnormality occurs in one system and driving is performed with the use of the other system.

The motor control device 10 according to the present embodiment controls driving of the motor 80 including the multiple motor windings 81 and 82, and includes multiple inverter circuits 120 and 220 and multiple control units 131 and 231. The control units 131 and 231 include signal output units 165 and 265 for outputting the control signals to the inverter circuits 120 and 220 provided, respectively. More specifically, the first control unit 131 outputs the first PWM signals PWM_u1*, PWM_v1*, and PWM_w1* as the control signals to the first inverter circuit 120 provided, correspondingly. The second control unit 231 outputs the second PWM signals PWM_u2*, PWM_v2*, and PWM_w2*, which are control signals, to the second inverter circuit 220 provided correspondingly.

The combination of the control units 131 and 231 and the inverter circuits 120 and 220 and the motor windings 81 and 82 provided, respectively, to the control units 131 and 231 is referred to as a "system". The control units 131 and 231 generate control signals with the use of the assist torque command values Trq1* and Trq2* which are command values calculated by the respective control units 131 and 231, the first dq-axis current detection values Id1 and Iq1 which are detection values involved in the host system, and the second dq-axis current detection values Id2 and Iq2 which are detection values involved in the other systems. In the present embodiment, in the first control unit 131, the first dq-axis current detection values Id1 and Iq1 correspond to "host system detection values" and the second dq-axis current detection values Id1 and Iq2 correspond to "the other system detection values". In the second control unit 132, the second dq-axis current detection values Id2 and Iq2 correspond to "host system detection values" and the first dq-axis current detection values Id1 and Iq2 correspond to "the other system detection values". In the present embodiment, each of the control units 131 and 231 commonly uses the current detection values Id1, Iq1, Id2, and Iq2 of the host system and the other system to generate the control signals. As a result, the first system L1 and the second system L2 can be appropriately coordinatively operated, and the inconsistency between the systems and the complexity of the arbitration can be reduced.

The control units 131 and 231 mutually transmit and receive the current detection values of the host system and the dq-axis current detection values Id1, Iq1, Id2, and Iq2, which are the current detection values of the other system with respect to each other, by a communication. More specifically, the first control unit 131 transmits the first dq-axis current detection values Id1 and Iq1, which are current detection values of the host system, to the second control unit 231, and receives the second dq-axis current detection values Id2 and Iq2, which are current detection values of the other system, from the second control unit 231. The second control unit 231 transmits the second dq-axis current detection values Id2 and Iq2, which are current detection values of the host system, to the first control unit 131, and receives the first dq-axis current detection values Id1 and Iq2, which are current detection values of the other system, from the first control unit 131. As a result, the control units 131 and 231 can appropriately acquire the other system detection values and use the acquired detection values for generation of the control signals.

The control units 131 and 231 perform a control so that the sum of currents of a plurality of systems becomes a current sum command value and the current difference becomes a current difference command value. With the control of the current sum, the motor 80 can output the required assist torque. Further, with the control of the current difference, the current difference between the systems can be appropriately controlled. In particular, the current difference command value is set to 0 to be able to eliminate the current difference between the systems, and therefore the heat generation of each system can be equalized. In addition, the complexity of control can be reduced at the time of current limitation due to a fluctuation of the power supply voltage or the heat generation, or at the time of backup control due to occurrence of a failure or transition to single-system driving.

In a period after the calculation of the current detection values Id1, Iq1, Id2, and Iq2 until the current feedback control starts, the control units 131 and 231 transmit and receive the detection values used for the current feedback control. The "detection values used for current feedback control" in the present embodiment are current detection values Id1, Iq1, Id2, and Iq2 of the respective systems. As a result, the current feedback control can be performed with the use of the current detection values Id1, Iq1, Id2, and Iq2 in the current control cycle.

The motor control device 10 according to the present embodiment is applied to the electric power steering device 8. The electric power steering device 8 includes the motor control device 10, the motor 80, and the reduction gear 89. The motor 80 outputs an assist torque for assisting the driver to steer the steering wheel 91. The reduction gear 89 transmits a driving force of the motor 80 to the steering shaft 92. In the present embodiment, since the control signals are generated by commonly using the current detection values Id1, Iq1, Id2, and Iq2 of the host system and other system to coordinatively operate the multiple systems, the assist torque can be appropriately output.

Second Embodiment

Figure 6:
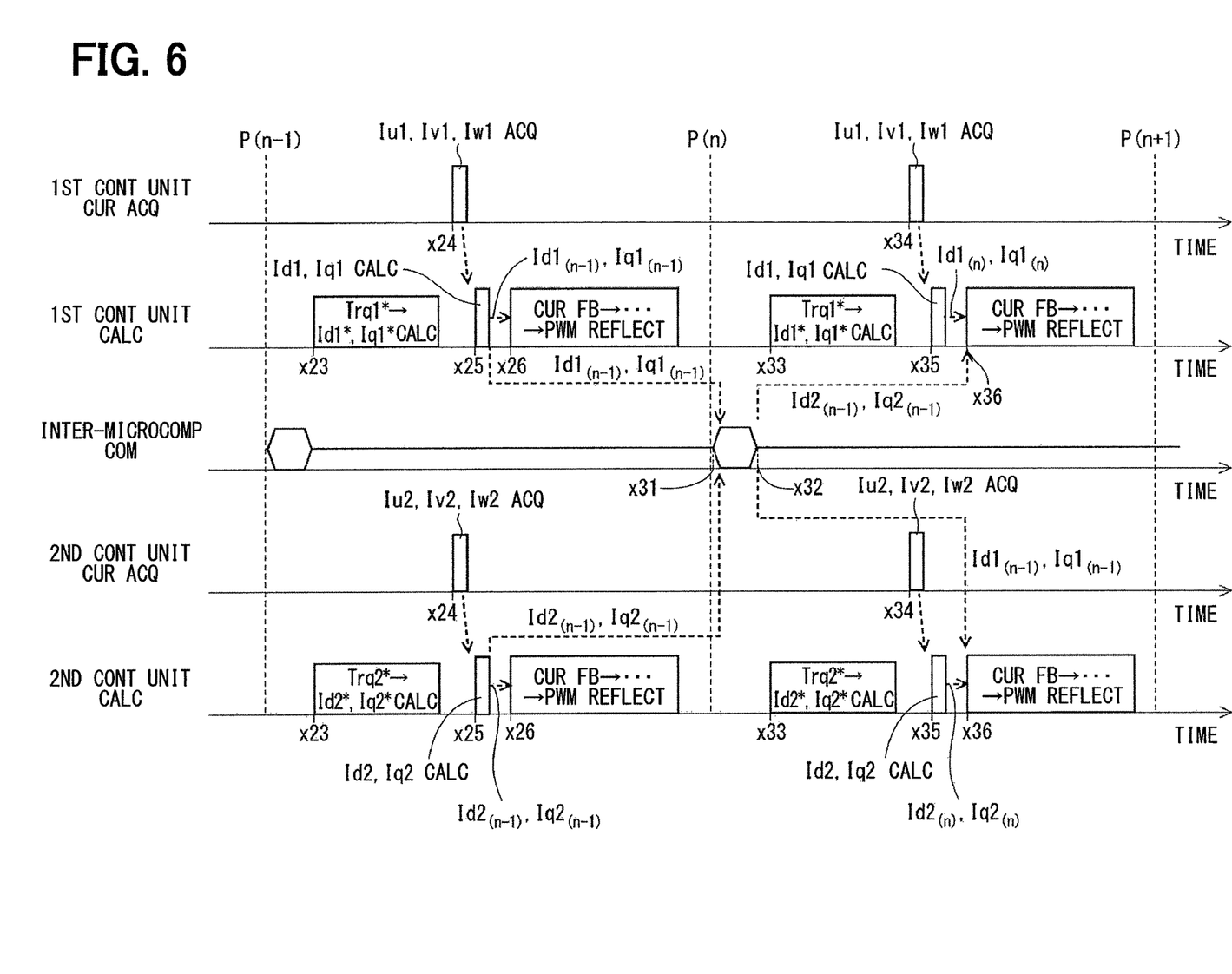
FIG. 6 is a time chart illustrating calculation processing according to a second embodiment.

A second embodiment of the present disclosure is shown in FIG. 6. Hereinafter, as appropriate, a subscript (n−1) is added to the value calculated in the previous control cycle P (n−1), and a subscript (n) is added to the value calculated in the current control cycle P (n). The processing at times x23 to x26 in the previous control cycle P (n−1) is the same as the processing in times x33 to x36 of the current control cycle P (n), and therefore a description of the processing will be omitted.

In the current control cycle P (n), an inter-microcomputer communication is performed between control units 131 and 231 at a time x31 to a time x32, and dq-axis current detection values Id1(n−1), Iq1(n−1), Id2(n−1), and Id2(n−1) calculated in the previous control cycle (n−1) are mutually transmitted and received between those control units 131 and 231. At a time x33, the control units 131 and 231 calculate assist torque command values Trq1*, Trq2*, and dq-axis current command values Id1*, Iq1*, Id2*, and Iq2*, respectively.

At times x34 and x35, the first control unit 131 acquires phase currents Iu1, Iv1, and Iw1, and calculates dq-axis current detection values Id1($n$) and Iq1($n$). The second control unit 231 acquires phase currents Iu2, Iv2, and Iw2, and calculates dq-axis current detection values Id2($n$) and Iq2($n$).

At a time x36, a series of calculations from a current FB calculation to output and reflection of PWM signals is performed. In the present embodiment, in the current FB calculation, the first control unit 131 uses the dq-axis current command values Id1*($n$) and Iq1*($n$) and the dq-axis current detection values Id1($n$) and Iq1($n$) of the host system in the current control cycle P (n), and the dq-axis current detection values Id2($n-1$) and Iq2($n-1$) of the other system in the previous control cycle P (n-1).

In the current FB calculation, the second control unit 231 uses the dq-axis current command values Id2*($n$) and Iq2* ($n$) and the dq-axis current detection values Id2($n$) and Iq2($n$) of the host system in the current cycle P (n), and the dq-axis current detection values Id1($n-1$) and Iq1($n-1$) of the other system in the previous control cycle P (n-1). In other words, in the present embodiment, calculation is performed with the use of the value of the current control cycle P (n) for the value calculated in the host system, and with the use of the value of the previous control cycle P (n-1) for the value calculated in the other system. As in the present embodiment, even a case in which the values involved in the previous control cycle are used for the detection values involved in the other system is included in the concept of "coordinative operation" in which the detection values involved in each system are commonly used to control the energization of each system.

As a result, there is no need to perform the inter-microcomputer communication between the calculation of the dq-axis current detection values Id1, Iq1, Id2, and Iq2 and the current FB calculation, so that a period from the end of the calculation of the dq-axis current detection values Id1, Iq1, Id2, and Iq2 to the start of the current FB calculation can be shortened. Therefore, as compared with the case where the inter-microcomputer communication is performed immediately before the current FB calculation, the closer current detection value can be used for the current FB calculation with respect to the value involved in the host system.

The control units 131 and 231 generate the control signal using the value in the previous control cycle as the detection value acquired from the other control unit. With the use of the value in the previous control cycle as the detection value acquired from the other control unit, the degree of freedom of the communication timing is increased. In the present embodiment, since the time from the calculation of the current command values Id* and Iq* to the start of the current feedback control can be shortened, a more recent value can be used for the value involved in the host system. In addition, the same effects as those of the above embodiment can be obtained.

(A) Control Units

In the embodiments described above, there are two control units. In another embodiment, there may be three or more control units. That is, the number of systems may be three or more. In addition, a plurality of drive circuits and a plurality of winding sets may be provided for one control unit.

In the above embodiment, the control unit controls the driving of the rotary electric device by the current feedback control. In another embodiment, the driving of the rotary electric device may be controlled by methods other than the current feedback control. In the above embodiments, the detection values mutually transmitted to and received from the respective control units are current detection values of the respective systems. In other embodiments, the detection values mutually transmitted to and received from the respective control units may be values other than current detection values. Instead of the inter-microcomputer communication, a common sensor value may be cross-input to each control unit, and a common detection value may be calculated by each control unit.

(B) Rotary Electric Device

In the embodiments described above, the rotary electric device is a three-phase brushless motor. In another embodiment, the rotary electric device is not limited to the brushless motor, but may be any motor. The rotary electric device is not limited to the motor, and may be a generator, or may be a so-called motor generator having the functions of the electric motor and the generator. In the above embodiments, the rotary electric device control device is applied to the electric power steering device. In another embodiment, the rotary electric device control device may be applied to devices other than the electric power steering device. As described above, the present disclosure is not limited to the embodiments described above, and can be implemented in various forms without departing from the spirit of the present disclosure.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A rotary electric device control device for controlling driving of a rotary electric device including a plurality of winding sets, the rotary electric device control device comprising:
   a plurality of drive circuits; and
   a plurality of control units that include signal output units for outputting control signals to the drive circuits corresponding to the control units, respectively, wherein:
   a combination of one of the control units, one of the drive circuits and one of the winding sets corresponding to the one of the control units is defined as a system;
   each of the control units includes a command calculation unit for calculating a command value of a host system and a communication unit for communicating with another control unit in another system;
   each of the control units transmits a host system detection value relating to a detection value of the host system to the other system, and receives another system detection value relating to another detection value of the other system from the other system; and
   each of the control units generates a control signal according to the command value calculated by each system, the host system detection value, and the system detection value.

2. The rotary electric device control device according to claim 1, wherein:

the host system detection value and the other system detection value are current detection values, respectively; and the one of the control units transmits and receives a current detection value of the host system and another current detection value of the other system to and from each other by a communication.

3. The rotary electric device control device according to claim 2, wherein:

the one of the control units controls the one of the winding sets to reach a sum of currents of a plurality of systems to be a current sum command value, and to reach a difference of the currents to be a current difference command value.

4. The rotary electric device control device according to claim 1, wherein:

the one of the control units transmits and receives the detection value and the other detection value to and from each other in a period after each control unit calculates the detection value and before a current feedback control starts.

5. The rotary electric device control device according to claim 1, wherein:

the one of the control units generates the control signal based on a value in a previous control cycle as the other detection value acquired from another one of the control units.

6. An electric power steering device comprising:

the rotary electric device control device according to claim 1;

the rotary electric device that outputs an assist torque for assisting a steering operation of a steering wheel by a driver; and a power transmission unit that transmits a driving force of the rotary electric device to a drive target.

* * * * *